(No Model.) 2 Sheets—Sheet 1.
R. SPROUL.
SHAFT ATTACHMENT FOR VEHICLES.
No. 394,141. Patented Dec. 4, 1888.
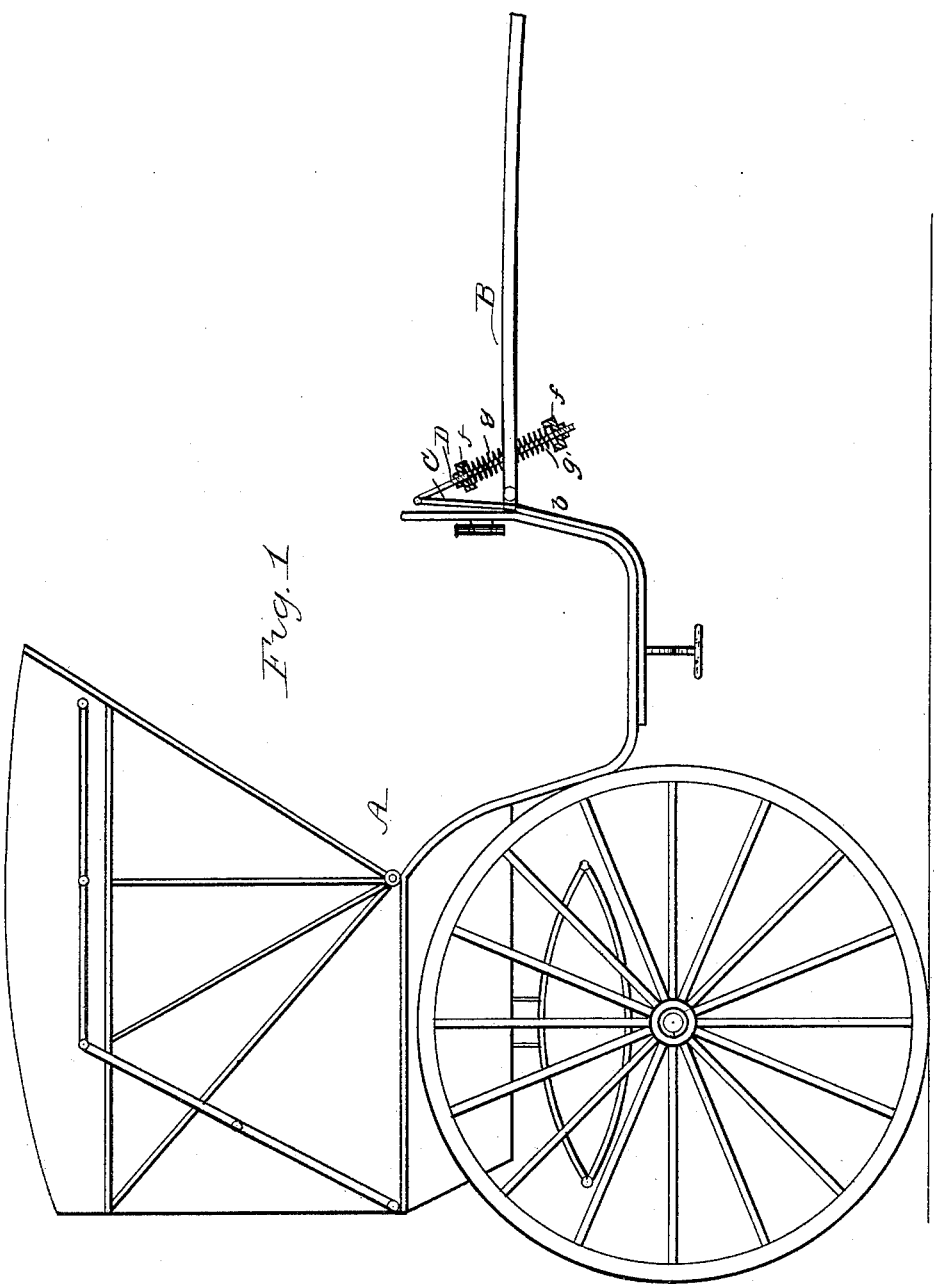
WITNESSES:
INVENTOR,
Robert Sproul
BY
ATTORNEYS.

(No Model.) 2 Sheets—Sheet 2.
R. SPROUL.
SHAFT ATTACHMENT FOR VEHICLES.
No. 394,141. Patented Dec. 4, 1888.
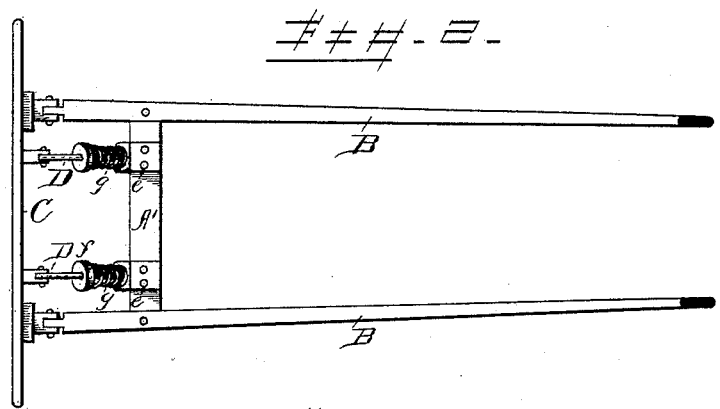
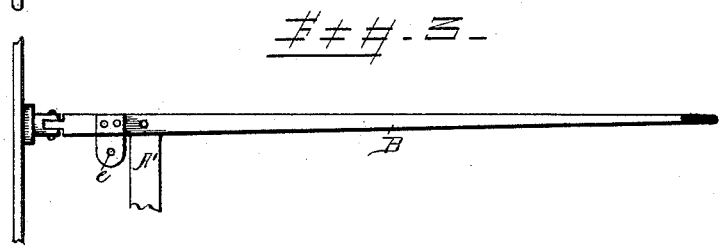
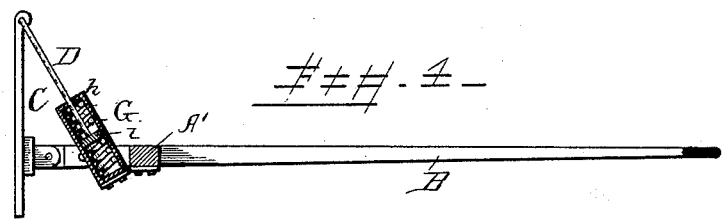
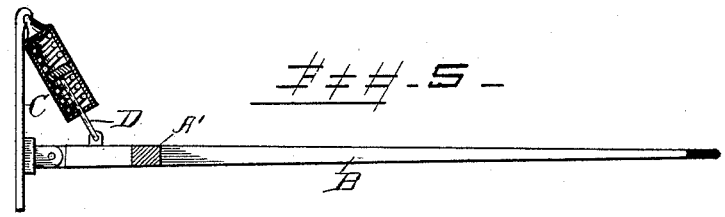
WITNESSES.
Albert P. Blackwood.
L. Paul.
Robert Sproul.
INVENTOR
By Connolly Bros
atty s.

UNITED STATES PATENT OFFICE.

ROBERT SPROUL, OF PITTSBURG, PENNSYLVANIA.

SHAFT ATTACHMENT FOR VEHICLES.

SPECIFICATION forming part of Letters Patent No. 394,141, dated December 4, 1888.

Application filed February 28, 1888. Serial No. 265,636. (No model.)

*To all whom it may concern:*

Be it known that I, ROBERT SPROUL, a citizen of the United States, residing at Pittsburg, in the county of Allegheny and State of Pennsylvania, have invented certain new and useful Improvements in Shaft Attachments for Vehicles; and I do hereby declare the following to be a full, clear, and exact description of the invention, reference being had to the accompanying drawings, which form part of this specification.

This invention has relation to that class of shaft attachments for two-wheeled vehicles—such as cabs, road-carts, and the like—which are designed and adapted to obviate what is known as the "horse motion" of the vehicle—that is, the jarring and jolting which occurs when the shafts are rigidly attached to the body of the vehicle.

In Letters Patent of the United States, dated May 17, 1887, No. 363,230, an expedient is shown for relieving the vehicle of the horse motion, the same consisting of a spring-brace connected with the shafts and with the front of the vehicle-body.

The present invention contemplates certain modifications in the arrangement of the brace and springs and their relation to the shafts; and it consists, essentially, in the combination with a two-wheeled vehicle having hinged shafts of a spring-brace coupled to the shafts and attached to a part of the vehicle above said shafts.

The invention consists, furthermore, in the novel construction and combination of parts, as hereinafter described, and specifically claimed.

In the accompanying drawings, Figure 1 is a side view of a two-wheeled vehicle furnished with my improvements. Fig. 2 is a top view of the shafts and connections. Fig. 3 is a top view of a modification. Figs. 4 and 5 are side views, modifications hereinafter explained.

In Figs. 1 and 2, A designates the vehicle, and B the shafts hinged to the front in any appropriate way, but preferably to the base-plates $b\ b$.

C C designate arms or standards, also secured to the vehicle and rising above the shafts in front of the body or dash-board. These standards may be constructed as parts or continuations of the base-plates $b\ b$, or they may be separate and independently attached to the vehicle-body.

D represents the brace-rods, which are either hinged, pivoted, or otherwise attached to the standards or arms C, from which they reach downwardly and outwardly at any angle and pass through holes in plates $e\ e$, secured either to the cross-bar A' or to the shafts. The braces D are threaded for a portion of their length to receive the flanged cup-shaped nuts or heads $f f$, by which the springs $g\ g'$ are held in place. The springs $g\ g'$ are fitted upon the brace, one spring being above and the other below the shafts, their inner ends abutting against the plates $e$, while their outer ends rest against the nuts $f\ f$. The horse motion of the vehicle or shafts is taken up by the upper or lower springs, according to the duction of the motion.

The shafts and vehicle have independent movement to a limited extent; but this movement is combined so that no jolting or jarring can take place.

In Fig. 4 I have shown a modification in keeping with the plan shown in the patent referred to, the springs being inclosed in a cylindrical casing, G, secured by clip or staple to the shafts or cross-bar, while the rod passes and plays through a hole in the cap $h$ of the cylinder, and is provided with a collar, $i$, on its lower end, which bears against the inner ends of the two springs, as shown.

Fig. 5 shows another modification within the scope of my invention, wherein the casings containing the springs are attached to the standards C C, or other parts of the vehicle above the shafts, while the brace-rods are connected at their lower ends to the shafts or cross-bar.

Having described my invention, what I claim as new, and desire to secure by Letters Patent, is—

1. In shaft attachments for vehicles, the combination, with the shafts in front of and above the bottom of the vehicle, of the spring-braces fastened above said shafts and connected thereto by a spring-connection, substantially as described.

2. In a two-wheeled vehicle, the combination, with the body of the vehicle and the shafts hinged or pivotally connected thereto, and situated in front of and above the bottom of the vehicle, of a spring-brace coupled to the shafts and to a part of the vehicle above the shafts, substantially as described.

3. In a two-wheeled vehicle, the combination, with the shafts hinged to the body of the vehicle in front thereof and above the bottom, and provided with the plates $e\ e$, of the rods or arms C, connected to the vehicle above the shafts and passing through the said plates, and the springs $g\ g'$, located, respectively, above and below said plates, substantially as described.

4. The combination, with the shafts and the brace-rods situated above the bottom of the vehicle and in front thereof, of the springs $g\ g'$, arranged, respectively, above and below the shafts, substantially as described.

In testimony that I claim the foregoing I have hereunto set my hand this 17th day of February, 1888.

ROBERT SPROUL.

Witnesses:
H. C. EVERT,
LOUIS MOESER.